Oct. 11, 1966   B. DEROUET ET AL   3,278,772
ACOUSTIC WAVE GENERATOR
Filed July 29, 1960   2 Sheets-Sheet 1
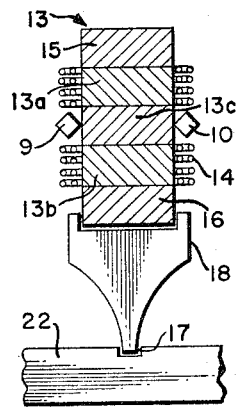
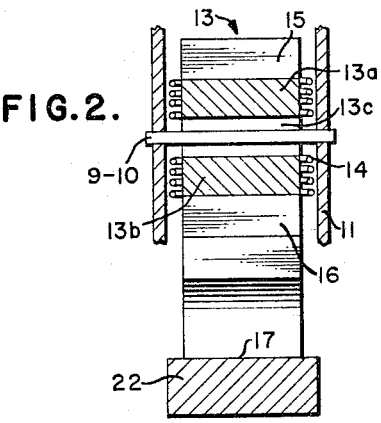
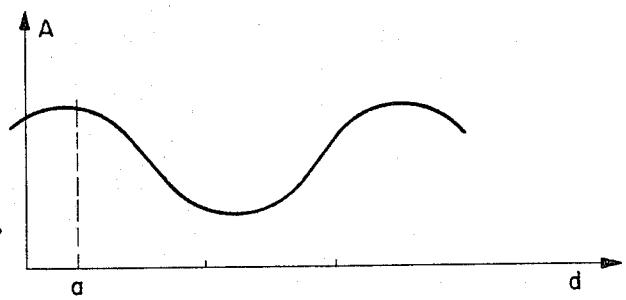
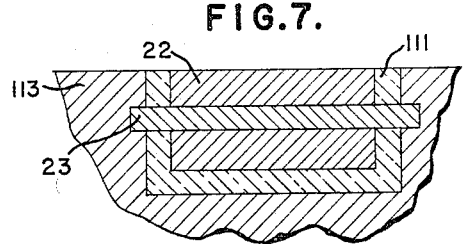
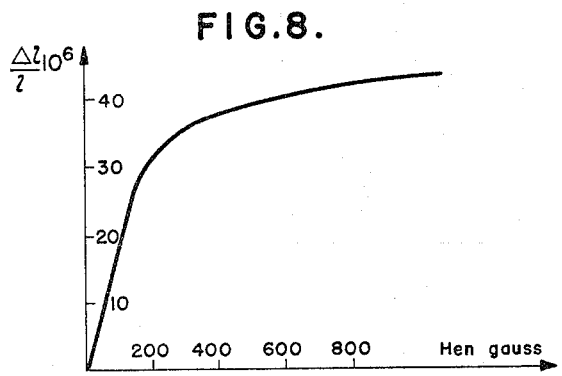
INVENTORS
BRICE DEROUET
FRANÇOIS BOCQUILLON

INVENTORS.
BRICE DEROUET
FRANÇOIS BOCQUILLON

United States Patent Office 3,278,772
Patented Oct. 11, 1966

3,278,772
ACOUSTIC WAVE GENERATOR
Brice Derouet and François Bocquillon, Paris, France, assignors to Compagnie Generale de Telegraphie Sans Fil, a corporation of France
Filed July 29, 1960, Ser. No. 46,312
Claims priority, application France, Aug. 10, 1959, 802,484
4 Claims. (Cl. 310—26)

Acoustic radiators are known comprising a thin strip wherein transversal bending waves are caused to propagate. The wavelength of such waves, as is known, depends on the frequency and on the thickness of the strip: in a thin strip, the wavelength can be made substantially smaller than the wavelength of the compression wave. It is thus possible to obtain propagation velocities which are only slightly higher than the velocity of sound in the ambient medium. Accordingly, a high directivity can be obtained, this directivity being the greater as the ratio of the wavelength to the length of the strip is smaller.

It is an object of the invention to provide an ultrasonic radiator for providing transversal bending vibrations or shears in a strip with a satisfactory efficiency, the exciter unit being entirely located on one side of the strip.

According to a preferred embodiment of the invention, the acoustic wave generator includes an exciter transducer or assembly comprising a plurality of exciters which are excited in alternately opposite phases and are spaced from each other by a half-wave of the wave propagating in the strip.

The invention will be best understood from the following description and appended drawing, wherein:

FIGS. 1 and 2 are, respectively, a sectional and a side view of an acoustical exciter device according to the invention;

FIGS. 4, 5, 6 and 8 are explanatory curves; and

FIG. 7 is a cross-sectional view of the device illustrated in FIG. 3.

Figure 3:
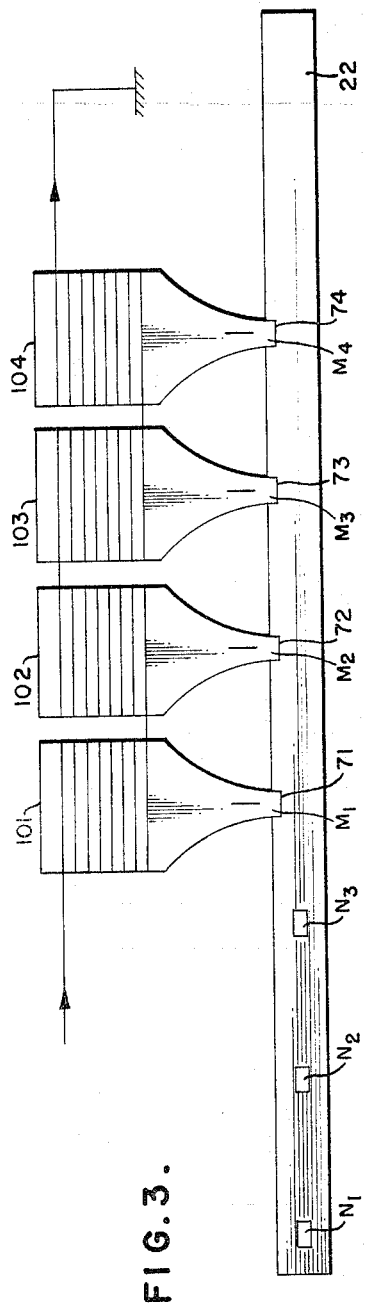
FIG. 3 is a longitudinal cross-sectional view of a preferred embodiment of the invention.

FIG. 1 shows an exciter device provided by the invention. It contacts a strip 22 in which it develops shearing stresses; the exciter comprises a magnetostrictive means 13, surrounded by a winding 14. Magnetostrictive means 13 includes two magnetostrictive elements 13a and 13b, separated by separator 13c, which drive two metallic pieces 15 and 16. Piece 16 rests on an acoustic impedance matching unit 18 which matches the impedance of the magnetostrictive means 13 to the impedance at the slot 17 formed in strip 22 and on which the exciter exerts its efforts. The exciter of FIG. 1 is not symmetrical with respect to strip 22. Winding 14 may be connected between ground and the positive terminal of the D.C. supply source and one of the terminals of the A.C. supply source.

The exciter shown in FIG. 1 has such a length that it vibrates at half-wave, i.e. has a vibration node located substantially in its central section for its operating frequency. By way of example, and although this is not strictly speaking necessary, FIG. 1 shows two holding bars 9 and 10, disposed along the nodal section 13c, and which secure the exciter to a frame 11, as shown in FIG. 2 which is a side view of the exciter with strip 22 in cross-section. This figure shows clearly that slot 17 extends substantially over the whole width of strip 22. The exciter has a generally parallelipiped shape. In order to minimize the phase shift due the presence of slot 17 and to obtain an excited wave having a maximum of purity, i.e., minimum harmonics, slot 17 is made very narrow, its width being of the order $\lambda/10$, $\lambda$ being the wavelength of the bending wave which is related to the operating frequency. The provision of the matching device 18 is thus necessary for optimum energy transfer. The best results for a given volume, for a given flexure rate, is obtained when its cross-section is limited by two by two exponential curves. In other words, the width of the top of the matching device 18 is fixed by the width of the magnetostrictive means 13 and the width of bottom of the matching device 18 as viewed in FIG. 3 is fixed by the width of the slot 17. Now, to insure optimum impedance matching the top width must taper down exponentially to the bottom width. Therefore, the length or height of the matching device 18 is controlled by the exponential tapering down. This exponential tapering down is obtained by making the projection of the side surfaces on the plane of the diagram of FIGURE 3 trace out exponential curves. Consequently, the minimum length of the matching device 18 is such that the desired exponential tapering down produced by the exponential curves is obtainable.

In the device just described, the alternating excitation field is of the order of 400 gauss. If it is desired to excite in strip 22 a bending wave with sufficient energy to obtain a substantial radiation, several exciters should be used. This also contributes to obtaining a suitable distribution of the shearing stress along the strip.

If several exciters 101, 102, 103 and 104 are used, they should be periodically spaced along strip 22 and excited alternately in phase opposition. The distance between centers $M_1$, $M_2$, $M_3$, and $M_4$ of the corresponding slots 71, 72, 73, 74 is substantially equal to $\lambda/2$, $\lambda$ being the wavelength of the bending wave in strip 22.

Bar 22 is rigidly attached at nodal points $N_1$, $N_2$ and $N_3$. It thus comprises three sections. In a first section, extending from the left hand end to slot 71, the strip is the seat of stationary waves with nodes at points $N_1$, $N_2$ and $N_3$. In a second section, which extends over the strip portion where the exciters are located, the stationary wave gives rise to a travelling wave. In a third section, which extends between the right hand end of the strip and exciter 104, the travelling wave is radiated into the ambient medium.

Figure 4:
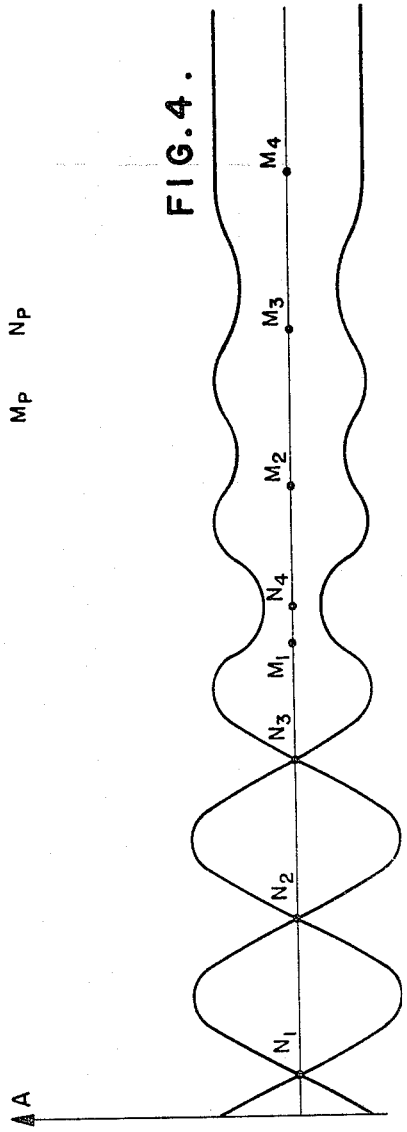

FIG. 4 illustrates the amplitude of the vertical displacements at various points of strip 22 as a standing wave representation.

Figure 5:
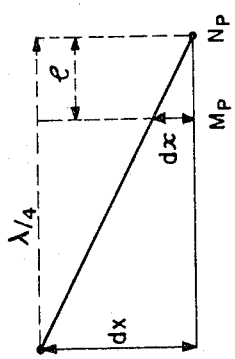

The length $N_1M_1$, $M_1$ being the center of slot 71, is determined so as to provide a good coupling of the exciters with strip 22. This length actually determines the position of nodes $N_1$, $N_2$ . . . with respect to the centers $M_1M_2$ . . . of slots 71, 72, 73 . . . and consequently the coupling and the acoustic matching. The displacement at the loops (antinodes) is indeed at a maximum, when the amplitude of the displacements of an exciter is equal to the amplitude of the displacement of strip 22 at the point where the exciter is applied thereto. The node $N_p$ ($p=1$, 2, 3 or 4) being determined, it is readily seen that the amplitude of the displacement $dX$ at the loop of vibration in the strip which is the closest is connected to the displacement $dx$ of the exciter, by the relation:

$$\frac{dx}{dX} = \sin\frac{2\pi l}{\lambda}$$

where $l$ is the distance $M_p$ to $N_p$, i.e., the distance between a node and an antinode. This corresponds, in fact, to the lever effect. FIG. 5 shows schematically how this effect is obtained.

It may be seen that, if the length $N_1M_1$ is caused to vary and a curve is drawn of the amplitude of the travelling waves occurring in the right hand section of strip 22, as a function of $N_1M_1$, maximum peaks will occur, as shown in FIG. 8, for $$d = N_1M_1 = a + n\lambda/2 \tag{2}$$

where $a$ is a fixed length and $n$ an integer (FIG. 6). The value of $a$ is defined by the position of one of these peaks.

The existence of nodes of pure stationary waves in sections $N_1M_1$, of strip 22, such as node $N_1$ (FIG. 4), for which the transversal displacements are rigourously nil, furnishes a satisfactory solution to the problem of providing fixing supports, since the latter may be located at nodal points $N_1$, $N_2$ and $N_3$, in the left hand section of strip 22.

The value of $n$ in Formula 2 and, consequently, the length $N_1M_1$, is determined by the number of the supports. This number is selected as a function of the intensity of impacts and stress to which the material is submitted. The total stress being distributed between a plurality of supports, each support is submitted to a stress which is below the breaking limit. Once the minimum number $n$ is determined in accordance with safety requirements, there is no use in increasing the number of supports, so as to avoid the additional acoustical losses which might occur if stationary waves were damped in part. Actually, with a limited number of supports, stationary waves may be rendered perfectly pure, which implies that there is no acoustic energy loss in the supports.

As shown in FIG. 4 the damped stationary waves prevail in the intermediate section of strip 22 comprising the slots and the exciters. The number of the exciters is selected so as to obtain a low standing wave ratio. In the left hand portion of strip 22, propagates a bending travelling wave and strip 22 is adapted to radiate sonic energy in the ambient medium.

FIG. 7 shows an embodiment of the supports for holdnig strip 22. In this fiure, strip 22 is illustrated in crosssection along a nodal plane. A pin 23 extends through strip 22 in the median longitudinal plane thereof and is embedded at its two ends into a stream-lined metallic body 113. It will be readily seen that, if body 113 is immersed into water and is moving therein, strip 22 does not exert any dragging action by opposing the flow of water, since it is flush with the external surface of body 113. The gap between body 113 and strip 22 may be filled with an acoustical insulating substance 111 such as a honeycomb material, formed by air filled rubber cells in order to assure both acoustical isolation and tightness.

It is known that, when a strip undergoes a bending vibration, the central portion or fibre of the strip in a nodal section is stationary and undergoes no bending and therefore may be clamped: it is this property which is used in the present case.

The arrangement according to the invention, by providing a plurality of exciters, is among others advantageous in that it makes it possible to obtain highly pure acoustical waves, i.e. waves having only few harmonics.

Actually, each of the elementary transducers generates not only the fundamental wave but also the harmonics thereof; this is due in part to the lack of linearity of the exciters. These harmonics have a wavelength equal to $\lambda/n$, $n$ corresponding to the order of the harmonic considered, if the strip material is not of a dispersive nature. It follows that these waves are in phase along slots 71, 72, 73. The second harmonics are in phase opposition between the slots, since the distance between the slots is then equal to one wavelength and the sources are in phase opposition. These harmonics are thus practically eliminated.

It is rather difficult to measure the rate of purity of the energy radiated. It is, however, possible to measure indirectly the harmonic rate by determining the resulting radiating diagrams: a purity rate higher than 25 db is readily obtained.

It should also be noted that the distribution of the generated acoustical energy between a plurality of transducers is interesting from several view-points:

(a) Magnetostrictive saturation.

It is well known that magnetostriction presents a marked saturation character. The curve of FIG. 8 shows, by way of example, longitudinal displacements under the Joule effect in a material known as "Permandur," which is an alloy having equal proportions of chromium and cobalt. It may be noted that this curve has a saturation point for an induction of about 400 gauss. It is therefore advantageous to have several transducers with a flux of 400 gauss, rather than a single transducer with a flux of 1200 gauss.

(b) Limited electrical power.

The electric power per element is also reduced in the ratio of the transducer number. This has the advantage of avoiding excessive thermal losses, especially if winding wires are fine, and also losses by hysteresis or eddy currents in the magnetic material of the transducer.

By distributing the excitation energy between several exciters, transistors may be used in the output stage instead of vacuum tubes. The advantage of using transistors lies in their low output impedance, as opposed to the high output impedance of vacuum tubes. This enables to feed the coils of the transducers with low impedance without electric current transformers. The use of transistors is, however, limited by the necessity of having a load impedance of fixed value and varying only within close limits. This object is difficult to achieve with a single exciter since the load impedance, which is given by the number of the turns, is essentially determined by the acoustic efficiency of the magnetostrictive phenomenon.

This will be no longer the case with a distributed excitation, where, to a certain extent, the choice of the number of the turns may be effected with a view towards obtaining a suitable load impedance of the transistor. The acoustic efficiency is then determined by a suitable choice of the number of transducers controlling the distribution of the excitation.

What is claimed is:

1. An electroacoustic transducer comprising: a flexible elongated strip having two sides; a plurality of magnetostrictive vibrators, positioned along the length of said strip and in contact with and normal to one of said sides for generating therein longitudinally propagating transverse bending vibrations having a predetermined operating wavelength; said vibrators being spaced apart a distance equal to one-half of said operating wavelength; and respective acoustical impedance matching means for matching said vibrators to said strip, said strip including a first section having means for securing the same at nodal points, a second section to which said vibrations are applied and a third section which is free to vibrate for radiating said vibrations as waves into an ambient medium.

2. A device for generating in an elongated strip including two sides, longitudinally propagating transversal bending vibrations, said device comprising at least one magnetostrictive vibrator disposed opposite and displaced from one side of said strip, and one acoustical impedance matching means for matching the acoustical impedance of said magnetostrictive vibrator to the acoustical impedance of said strip, said matching means including a first end fixed to said magnetostrictive vibrator and including a second end for acoustic coupling to said strip, said second end extending transversely across said strip and vibrating in response to said magnetostrictive vibrator in a direction perpendicular to said one side of said strip.

3. An acoustic radiator system comprising: a flexible elongated strip having two sides; and a plurality of magnetostrictive vibrator means, normal to and in contact with one of said sides with the respective points of contact with said strip, connected to and positioned lengthwise of said one side for generating therein longitudinally propagating transverse shear vibrations having a predetermined wavelength; said vibrator means being spaced apart a distance equal to one-half of said wavelength; said vibrator means including acoustical impedance matching means for impedance matching said vibrator means to said strip, said strip having a first section, and in said section, a plurality of transversal pins, said pins being spaced apart a distance equal to one-half of said wavelength; a solid section to which said vibrator means are in contact and a third section which is free to vibrate, coupled to the ambient medium.

4. An acoustic radiator system comprising: a flexible elongated strip having two sides and a plurality of magnetostrictive vibrator means normal to one of said sides and having their respective points of contact with said strip, connected to and positioned lengthwise of said one side for generating therein longitudinally propagating transverse bending vibrations having a predetermined wavelength; said vibrator means being spaced apart a distance equal to one-half of said wavelength; said vibrator means including acoustical impedance matching means for matching said vibrator means to said strip, said strip having a first section, and in said section, a plurality of transversal pins, said pins being spaced apart a distance equal to one-half of said wavelength; a solid body, and means for securing said pins in said body, an insulating means between said body and said strip, a second section, to which said vibrator means are applied and a third section which is free to vibrate, coupled to the ambient medium.

References Cited by the Examiner
UNITED STATES PATENTS

| | | | |
|---|---|---|---|
| 2,210,415 | 8/1940 | Kellogg | 330—30 |
| 2,234,490 | 3/1941 | Gilbert | 84—1.15 |
| 2,407,328 | 9/1946 | Turner | 340—11 |
| 2,408,404 | 10/1946 | Batchelder | 340—11 |
| 2,723,386 | 11/1955 | Camp | 340—11 |
| 2,854,795 | 10/1958 | McCown et al. | 51—59 |
| 2,956,278 | 10/1960 | Branchu | 340—11 X |

MILTON O. HIRSHFIELD, *Primary Examiner.*

FREDERICK M. STRADER, CHESTER L. JUSTUS, KATHLEEN H. CLAFFY, DAVID X. SLINEY,
*Examiners.*

C. E. ROBERTS, *Assistant Examiner.*